(12) United States Patent
Green

(10) Patent No.: US 7,313,475 B2
(45) Date of Patent: Dec. 25, 2007

(54) DELAY BANKING FOR AIR TRAFFIC MANAGEMENT

(75) Inventor: Steven M. Green, Cupertino, CA (US)

(73) Assignee: United States of America as Represented by the Administrator of the National Aeronautics and Space Administration (NASA), Washington, DC (US)

( * ) Notice: Subject to any disclaimer, the term of this patent is extended or adjusted under 35 U.S.C. 154(b) by 62 days.

(21) Appl. No.: 11/053,713

(22) Filed: Feb. 1, 2005

(65) Prior Publication Data

US 2006/0173609 A1    Aug. 3, 2006

(51) Int. Cl.
*G01C 21/00* (2006.01)
*G06F 19/00* (2006.01)

(52) U.S. Cl. ..................................... 701/120
(58) Field of Classification Search ............... None
See application file for complete search history.

(56) References Cited

U.S. PATENT DOCUMENTS

| | | | |
|---|---|---|---|
| 6,314,361 B1 * | 11/2001 | Yu et al. ................. | 701/120 |
| 6,393,358 B1 * | 5/2002 | Erzberger et al. ........ | 701/120 |
| 2003/0078719 A1 * | 4/2003 | Zobell et al. ............ | 701/120 |
| 2005/0071206 A1 * | 3/2005 | Berge .................... | 705/6 |

FOREIGN PATENT DOCUMENTS

JP    2000-331300    * 11/2000

OTHER PUBLICATIONS

Green, et al., Distributed Air-Ground Traffic Management for En Route Fligh . . . ; Proceedings of AIAA Guidance, Navigation, and Control Conference, Aug. 14-17, 2000, Denver, CO.

Green, et al., Distributed Air/Ground Traffic Management for En Route Flight Operations, Air Traffic Control Quarterly, Special Issue, 2001, 259-285, 9-4.

Green, et al., Development and Evaluation of a Profile Negotiation Process for Integrating Aircraft and Air Traffic Control . . . , NASA Technical Memorandum 4360, Apr. 1993.

Green, et al., Enabling User Preferences Through Data Exchange, Proceedings of AIAA Guidance, Navigation, and Control Conference, Aug. 11-13, 1997, New Orleans, LA.

* cited by examiner

*Primary Examiner*—Michael J. Zanelli
(74) *Attorney, Agent, or Firm*—John F. Schipper; Robert M. Padilla (57) ABSTRACT

A method and associated system for time delay banking for aircraft arrival time, aircraft departure time and/or en route flight position. The delay credit value for a given flight may decrease with passage of time and may be transferred to or traded with other flights having the same or a different user (airline owner or operator). The delay credit value for a given aircraft flight depends upon an initial delay credit value, which is determined by a central system and depends upon one or more other flight characteristics. Optionally, the delay credit value decreases with passage of time. Optionally, a transaction cost is assessed against a delay credit value that is used on behalf of another flight with the same user or is traded with a different user.

36 Claims, 4 Drawing Sheets

DELAY BANKING FOR AIR TRAFFIC MANAGEMENT

ORIGIN OF THE INVENTION

This invention was made, in part, by one or more employees of the U.S. government. The U.S. government has the right to make, use and/or sell the invention described herein without payment of compensation therefor, including but not limited to payment of royalties.

FIELD OF THE INVENTION

This invention relates to allocation of priority to one or more aircraft subject to air traffic flow restrictions.

BACKGROUND OF THE INVENTION

The Federal Aviation Administration (FAA) operates our national airspace (NAS). Airspace users of the NAS include air carriers (airlines), general aviation users, and military users. The FAA provides Air Traffic Management (ATM) services, including Air Traffic Control (ATC) services, to separate aircraft, and Traffic Flow Management (TFM) services to manage congestion associated with a resource. As used herein, "resource" refers to a sector or group of sectors in one or more Air Route Traffic Control Centers (ARTCCs) and to a region of airspace surrounding an airport, where congestion is managed by imposition of air traffic flow restrictions ("flow restrictions") on inbound traffic upstream of the resource. With reference to a given flight, the airport may be a destination airport or an origin airport.

When congestion problems exist or are anticipated to exist (i.e., when the traffic demand exceeds the resource capacity), the FAA invokes TFM flow restrictions to control flows through a combination of departure delays, ground stops, route changes (reroutes), altitude changes (capping), and the spacing/metering of en route traffic and/or arrivals. Congestion problems may occur when traffic demand exceeds airspace/airport capacity (e.g., rush hour or situations where traffic is deviated from elsewhere), and/or when actual capacity is lowered from nominal levels due to weather and/or the loss of NAS capabilities (e.g., loss of communications, navigation, or surveillance services).

TFM flow restrictions are managed on a continuum from the strategic to the tactical. Strategic TFM is coordinated by the FAA's ATC System Command Center (ATCCC) in Herndon Va. Strategic flow restrictions for a given resource typically involve large amounts of traffic, multiple ATC facilities, and time horizons or lead times on the order of 1.5–6 hours or more before the actual congestion or other problem is predicted to occur. Strategic flow restrictions are coordinated through the ATCSCC and implemented by the local ATC facilities that control the actual traffic. The national Ground Delay Program (GDP) is an example of a strategic flow restriction. Tactical TFM typically involves smaller amounts of traffic, one or a few local ATC facilities in close proximity, and time horizons on the order of a few minutes to 2 hours. Arrival metering via the Center TRACON Automation System (CTAS) Traffic Management Advisor (TMA) or Multi-center TMA (McTMA) is an example of a tactical flow restriction.

Previous CTAS studies include studies on the integration of user and ATM systems (e.g., integrating the airborne Flight Management System (FMS) with CTAS) to enable user-preferred four-dimensional (4D) trajectories. The initial focus had been on optimization of trajectories in the presences of flow constraints such as required times of arrival (RTA) for arrival metering. However, it has become apparent that it is equally important, if not more so, to negotiate the selection of RTA for each flight, as contrasted with the trajectory selected to meet the RTA. RTA negotiation was proposed by S. M. Green, W. den Braven, and D. H. Williams in "Development and Evaluation of a Profile Negotiation Process for Integrating Aircraft and Air Traffic Control Automation," NASA Technical Memorandum 4360, April 1993.

Interactions with the ATC coordinator of United Airlines during the 1993/94 CTAS TMA field tests at Denver Center confirmed the desire for users to collaborate on arrival metering, not just to determine an RTA, but also for arrival sequences. Sequences are less challenging to negotiate than specific RTAs, and provide a mechanism for an airline to influence the order of an arrival bank and move a later-arriving aircraft to an earlier position in a queue while moving earlier flights to later positions. This concept was further defined by S. M. Green, T. Goka, and D. H. Williams in "Enabling User Preferences Through Data Exchange," AIAA 97-3682, AIAA Guidance, Navigation and Control Conference, New Orleans, La., Aug. 11–13, 1997. The concept evolved into a Distributed Air-Ground Traffic Management (DAGTM) approach for User-Preferred Arrival Metering, as discussed by S. M. Green, K. Bilimoria., and M. G. Ballin in "Distributed Air-Ground Traffic Management for En route Flight Operations," AIAA 2000-4064, Guidance, Navigation, and Control Conference, Denver Colo., August 2000.

One problem encountered is that airspace users want to influence the priority of the users' flights that are subject to TFM flow restrictions. In many cases, a single flight may be impacted by more than one flow restriction as the aircraft moves across the NAS from one ATC facility or resource to another. Once an aircraft is airborne, many factors may influence its actual arrival time, including deviations for flow restrictions. Airspace user preferences include flight sequence and schedule (arrival time), among others. If flights are to be delayed and/or deviated, the users may value certain flights more over others (e.g., to maintain the integrity of the user's overall network schedule). Airspace users want to minimize delays for more than one flight, by optimizing the use of the user's fleet and by maintaining the integrity of the user's network schedule and airport arrival and departure banks.

The FAA and airspace users have achieved much progress over the past decade in the application of Collaborative Decision Making (CDM) principles to flow restrictions. CDM involves the sharing of data between the FAA and users to develop a common situation awareness and collaborative methods for making decisions that affect traffic flows and individual flights. Limitations are present, particularly with respect to a lack of CDM processes for tactical flow restrictions on a local and regional level.

Some of the objectives are to facilitate CDM for flow restrictions on a local and regional level, to allow users to identify queue sequence preferences and priorities for the users' flights as an aircraft enters and/or moves across sectors with flow restrictions throughout the NAS, to credit an aircraft for flow restriction impacts the aircraft absorbs relative to other aircraft, and to enable the FAA, through the TFM system, to equitably accommodate those priorities.

Airspace users are primarily interested in arriving on time and maintaining the user's network schedule, second only to the safe operation of the user's flights. Special problem characteristics arise from the individual nature of flow restrictions and how these restrictions affect individual flights within the NAS.

(1) Flow restrictions vary in form. Two types of flow restrictions are relevant here: Metering/Spacing; and changes to the route or planned altitude profile. Relatively few Metering/Spacing restrictions (such as TMA arrival metering) are time-based today, but this circumstance will change as TMA is deployed to serve more airports, and as Regional Metering enhancements are implemented within a Multi-Center TMA (McTMA) to enable time-based en route metering. Nevertheless, Metering/Spacing restrictions restrict the rate of flow of a stream of flights through a fix or airspace (e.g., 60 flights/hour or 10 miles in trail). Flight trajectories are typically modified by air traffic controllers to conform to such restrictions (i.e., adjustments in speed, heading, and/or altitude to delay the flight), but the trajectories are not necessarily changed to avoid a region of airspace. Alternatively, the second type of restriction involves a change to the route and/or altitude profile of a flight to physically move the flight to another region of airspace. For example, a flight might be rerouted to another arrival fix to enter a congested terminal area from a less congested direction, or a flight might be rerouted (or restricted in altitude) to completely avoid a congested sector/region of airspace. In summary, the first type of restriction focuses on managing the flow-rate while the second type focuses on moving a flight to another region of airspace. Both types of restrictions may be applied to aircraft in various phases of flight from pre-departure (pushback and take-off), departure/ascent, en route, and arrival/descent. Any one flow restriction may involve multiple flights in various phases of flight (e.g., spacing for en route congestion may involve some flights from nearby airports that have not yet departed as well as airborne flights that are airborne and will be transiting the impacted sectors in cruise or ascent/descent to/from cruise altitude. Both types of restrictions will affect delay, either directly in the case of metering/spacing, or indirectly in the case of reroute/altitude flow restrictions.

(2) If an aircraft is delayed by one flow restriction earlier in its flight (e.g., delay in departure or in push-back from a gate), the aircraft loses its original place relative to other flights as the aircraft progresses downstream. As a result, sequentially-experienced flow restrictions accumulate. If congestion-based queues form downstream, the previously restricted aircraft enters the queue later and loses its position and priority, relative to other aircraft. that would have nominally been scheduled to arrive near the same time.

(3) The operational impact of CDM for flight priority/sequence grows with the time horizon over which such priority is in effect. Users need to be able to compete or negotiate for flight priority over time horizons that are significantly greater than what is available for individual tactical flow restrictions.

(4) To effectively leverage user-preferred sequences and priorities, a user needs to be able to "collaborate" with TFM over most, if not all, of the user's flights that contribute to a flow restriction. If a user is restricted to priorities within the user's own fleet, there may be little benefit in asserting a flight priority.

(5) Equitable access to airspace and ATM services is a fundamental desire of airspace users.

(6) It is not equitable to enable one user's preferred sequence/flight priority at the cost of negatively impacting another user's delay. Sequences preferred between flights of a first user may be fair as long as these preferences don't add unacceptable net delays and/or penalties to a second user's flights.

(7) When en route and arrival metering restrictions are enforced, an ARTCC often restricts internal departures on a tactical basis, pending designation of an APREQ departure-release time by the ARTCC, in order to insert the aircraft departure into an unoccupied time slot in the restricted overhead traffic stream. If the overhead stream is already full at the time of the departure request, the aircraft is often held on the ground until a time slot occurs upstream, resulting in an inequitable delay for departure of the aircraft relative to the overhead traffic.

What is needed is an approach that (1) allocates and accumulates aircraft flight delay credits to each of a collection of one or more aircraft that experiences one or more flow restrictions relative to one or more resources (sector or airport), (2) allows bidding of part or all of the accumulated delay credits for priority handling of an individual aircraft in response to imposition of a flow restriction on a flight or group of flights, and (3) facilitates transfer or trading of delay credits among two or more aircraft flights, for the same airline or for different airlines, in a queue or in different queues. Preferably, the approach should integrate allocation, accumulation and consumption of flow restriction-based delay credits and should ensure that such delay credits are not monopolized by one or a few airlines.

SUMMARY OF THE INVENTION

These needs are met by the invention, which provides an integrated system that provides for allocation and accumulation of delay credits, allows bidding of the accumulated credits for priority handling of an individual aircraft or two or more aircraft in response to imposition of a flow restriction on a flight or group of flights, and facilitates transfer of delay credits among aircraft operated by the same user (e.g., an airline) and/or trade of delay credits between users.

The primary contribution of delay banking is NAS-wide CDM for en route and arrival metering. A second element, collaborative tactical-departure-release planning, is a complimentary feature to facilitate CDM for departure release into congested en route- and arrival-metering situations.

Delay banking involves at least four aspects (accumulation, bid, delay credit transfer and delay credit trade), at least the first two of which are present in any consideration of measurement and/or consumption of delay credits within a delay credit transaction.

Computation of delay credits may be based upon change in: (i) estimated time of arrival ("$\Delta$ETA"), measured relative to a metering fix or geographic reference geometry; (ii) $\Delta$ETA relative to a location at which a flow restriction ends (e.g., a meter fix or entry into a protected resource region); and (iii) a computed equivalent of $\Delta$ETA that takes account of differences arising from acceptance of reassignment of a different route and/or a different planned altitude profile (PAP) and/or a different destination airport.

Delay credits, once earned, can be applied in various situations, for example, to enter a bid for priority handling in response to imposition of a new flow restriction on a flight or group of flights; if the bid is unsuccessful, all or a portion of the credit is returned to the bidder. Where the bidder-aircraft is part of a queue, the delay credits can be used (consumed) to move the bidder to an earlier location in the queue, in order to reduce that bidder-aircraft's delay. Where the flow restriction involves a choice of alternate routes, planned altitude profile, aircraft spacing, or other non-queue flow restrictions, the delay credits can be used to bid for an alternative assignment.

A user may spend delay credits, accumulated on one flight, on other flights operated by the same user. Delay credits can be transferred between two or more flights by the same user. Examples of this transaction are: (i) transfer among flights on the same day involving the same resource and/or the same flight route; (ii) transfer among flights on the same day involving different resources and/or having different flight routes; and (iii) transfer among flights on different days. Here, an independent third party, such as a central system CS that continually monitors the flights and maintains records of the accumulated delay credits, is used to analyze potential transfers, to implement transfers that are accepted, and to ensure fair treatment of all participating aircraft.

Delay credits can also be traded between different users, according to market rules that are determined by NAS stakeholders, preferably in a manner that treats smaller users (e.g., a user operating fewer flights) fairly. The delay credit transfer procedure may be implemented among users that affirmatively agree to participate, or all users operating within a given region (e.g., a group of ARTCC sectors, an ARTCC, or the entire continental U.S.) may be required to participate.

DESCRIPTION OF BEST MODES OF THE INVENTION

Time delay and/or route alteration (including variation of a planned altitude profile ("PAP") and/or variation of flight waypoints), referred to herein collectively as "flow restrictions," can be imposed by one or more traffic management coordinators (TMCs) to mitigate the impact of inclement weather (en route or near the destination airport), en route congestion along the originally chosen route, and congestion near the destination airport.

Delay banking involves four aspects, the first two of which represent a minimum capability and the last two of which are optional enhancements: (i) allocation and computation and subsequent modification of delay credits accumulated as a result of imposition of flow restriction; (ii) bidding of delay credits, by a user, to obtain a modification of the priority for a specified flight, in response to imposition of an air traffic flow restriction ("flow restriction") upon a specified resource or resources; (iii) transfer of delay credits between aircraft flights belonging to a single user; and (iv) trading of delay credits between flights of aircraft owned or operated by different users.

A flow restriction may be implemented through one or more of the following: delay or modification in preparation of an aircraft for takeoff; decrease in air speed for ascent, cruise and/or descent of the aircraft to at most a specified threshold air speed; change in position for the aircraft in a queue of all aircraft traveling along at least one segment of a planned route; change in at least one segment of a planned altitude profile for the aircraft; and change in at least one segment of a planned route for the aircraft.

A flow restriction may result from (1) inclement weather at an origin airport, en route or at a destination airport, (2) congestion on the ground at the origin airport or at the destination airport; (3) runway unavailability; (4) congestion in the air near the origin airport or the destination airport; (5) congestion associated with one or more flight route segments; or (6) other related reasons. Most of these flow restrictions arise from (i) an unanticipated increase in demand for a particular resource or (ii) an unanticipated decrease in resource availability. A flow restriction may result in a time delay or a change in a planned altitude profile, or a change in one or more segments of a planned flight route.

An aircraft that accepts, or has imposed on it, a flow restriction may accumulate certain delay credits. These delay credit units may be expressed directly in minutes of time delay, and fractions thereof. For example, a time delay of no more than q sec ($0 \leq q < 60$) may accrue no delay credits; and a time delay $\Delta t(delay)$ in a time interval $N+q \leq \Delta t(delay) < N+1-q$ ($N=1, 2, \ldots$) may accrue N delay credits.

Alternatively, the aircraft that accepts, or has imposed upon it, a time delay may accrue integer multiples of a base delay credit, according to the first aspect of the invention. As an example: a time delay below a threshold time or base delay time, such as 0–30 sec, may have no associated delay credits; a time delay in a range 30 (sec)$<\Delta t(delay)<n1\cdot 60$ may accumulate 1 delay credit; a time delay in a range $n1\cdot 60 \leq \Delta t(delay) \leq n2\cdot 60$ (sec) may accumulate 2 delay credits; and a time delay greater than $n2\cdot 60$ sec may accumulate 3 or more delay credits, where n1 and n2 are positive integers with $1 \leq n1 < n2$.

Aspect 1: Accumulation of Delay Credits.

The basic delay credit represents the impact of a flow restriction on a specific flight, such as the change in arrival time due to the imposition of a flight restriction. A delay credit value allocated to an aircraft flight or user may vary from one situation to another, according to one or more of the following factors, among others: present distance D(dest) of the aircraft from a reference such as a metering fix/geometry or destination airport; distance D(origin;dest) of the aircraft from its most recent origin airport to a metering fix or to the destination airport; scheduled cruise altitude for the aircraft; scheduled flight route for the aircraft; number of flights with substantially the same ETA as the aircraft at a metering fix or at the destination airport; time difference between the scheduled time of departure and ETA for this aircraft; at least one estimated weather condition for the metering fix or destination airport at the ETA; an estimate of excess fuel carried by the aircraft for a flight between the origin airport and the destination airport; accumulated time delay credits for the aircraft; number of passengers scheduled to be on board the aircraft; time of day of the ETA for the aircraft; day of the week of the ETA for the aircraft; date of the ETA for the aircraft; and a priority initially assigned to the flight.

When one or more delay credits has been accumulated, these credits may continue at the original (initial) value, unless subsequently used to change priority or transferred or traded as discussed in the following. Alternatively, delay credits may be subjected to an attenuation procedure, whereby an initial value of M0 delay credits at a time t=t0 becomes a smaller present value $$M(t;t0)=M(t0)\cdot A(t-t0), \quad (1)$$

at a later time t>t0, where A(t−t0) is a monotonically decreasing function of a non-negative time difference t−t0. If attenuation is incorporated into delay credit valuation, examples of attenuation functions include, but are not limited to:

$$A(t-t0) = \exp\{-a \cdot (t-t0)^b\}, \quad (2A)$$

$$A(t-t0) = \max\{0, \cos^c\{d \cdot (t-t0)^e\}, \quad (2B)$$

$$A(t-t0) = \max\{0, \mathrm{sech}\{f \cdot (t-t0)^g\}, \quad (2C)$$

$$A(t-t0) = 1/\{1 + h \cdot (t-t0)^j\}^k, \quad (2D)$$

where a, b, c, d, e, f, g, h, j and k are non-negative numbers (not necessarily integers) and t−t0≧0.

Figure 1:
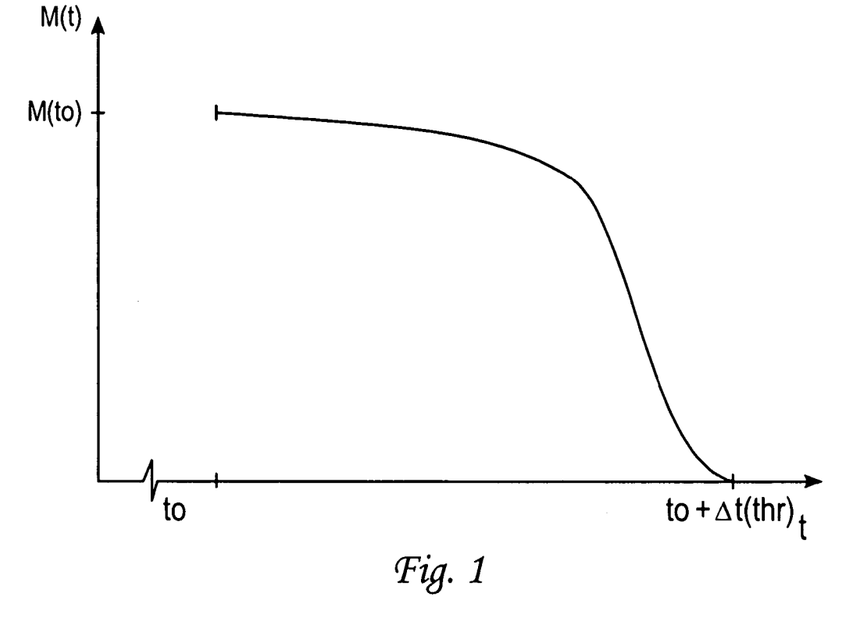
FIG. 1 graphically illustrates an example of attenuation of a delay credit.

Another group of attenuation functions satisfy: (1) A(t−t0)=1 for t−t0=0; (2) A(t−t0) monotonically decreasing for t−t0 positive and increasing; and (3) A(t−t0)=0 for t−t0>Δt(thr) (a selected positive temporal value). Here, the attenuation function drops (abruptly or smoothly) to 0 for t−t0 greater than the selected threshold time Δt(thr), as illustrated in FIG. 1.

Figure 2:
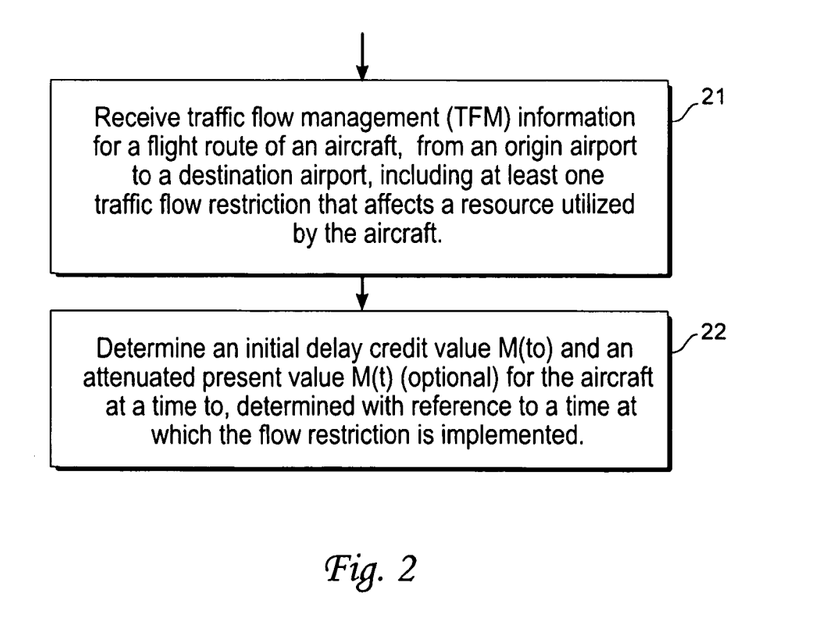
FIGS. 2, 3, and 4 are flow charts of procedures for practicing aspects of the invention.

FIG. 2 is a flow chart illustrating a procedure for determining and allocating a delay credit (first aspect), arising from implementation of a flow restriction on a resource utilized by an aircraft. In step 21, a system, which determines and allocates delay credit, receives Traffic Flow Management (TFM) information for a flight route of an aircraft, from an origin airport to a destination airport, including at least one traffic flow restriction that affects a resource utilized by the aircraft. In step 22, the system determines an initial credit value M(t0) and an attenuated present value M(t;t0) (optional) for the aircraft that is associated with the at least one flow restriction at a time t0 determined with reference to a time t (>t0) at which the flow restriction is implemented. The system may include the aircraft and/or may include a centralized delay credit determination system, spaced apart from the aircraft, that determines and allocates delay credits.

Aspect 2: Bidding of Delay Credits

A selected number of delay credits, once earned, can be bid by a user or users to modify or enhance the priority of one or more of the user's flights on which one or more flow restrictions have been imposed. Where two or more flights on the same day involve the same resource and/or the same flight route segment, and a flow restriction is encountered, one or more users may wish to rearrange the priorities assigned to these and other user aircraft flights affected by the flow restriction. Each user may choose bids for each flight operated by the user, in order to influence relative priority (e.g., sequence in a queue) of each flight relative to other flights operated by that user or other users. In order to maintain fairness between different users, a central system CS is preferably regulated, if not provided, by the air traffic service provider to facilitate the aspects of delay banking. The central system CS receives relevant information on the proposed priority modifications, which information may include a unique flight identification number, including flight departure date and time, origin and destination airports and tail identification number for each aircraft involved. The application of bidding in a metering-restrictions scenario is illustrated in the following example.

Example of Operation of Bidding, Aspect No, 2.

Consider an initial arrangement for arrival of five aircraft (AC=A, B, C, D, E) at a specified metering fix. Table 1 sets forth the relative positions and relative time delays in an initial arrival queue (columns 2–4) and in a resulting arrival queue after entry of a bid of 4 delay credits (e.g., 4 minutes) by aircraft E. The aircraft are allowed to arrive with 3-minute spacing (e.g., at times 0:00, 3:00, 6:00, 9:00 and 12:00). ETA and STA refer to the estimated time of arrival of an aircraft flight and to a scheduled time for arrival, respectively, at a metering position. With the initial ETA as set forth in column 2, the aircraft A, B and C are unaffected when aircraft E moves into a fourth position (with resulting ETA of 05 and resulting STA of 09), with a resulting ETA (after entry of bid) of 09−04=05 (minutes) and thus ahead of aircraft D (ETA unchanged at 06). The result of entry of the bid of 04 delay credits by E is that aircraft E has a resulting delay (STA minus pre-bid ETA) of 00 (as compared to an initial delay 03 of before bidding; and aircraft D has a resulting delay of 06, as compared with an initial delay of 03. In summary, aircraft E bid its delay credits to earn an earlier position in the arrival queue.

TABLE 1

Implementation of Bidding.

| AC | ETA | STA | Initial Delay | Bid | ETA | STA | Delay After Bid |
|----|-----|-----|---------------|-----|-----|-----|-----------------|
| E  | 09  | 12  | 03            | 04  | 05  | 09  | 00              |
| D  | 06  | 09  | 03            |     | 06  | 12  | 06              |
| C  | 04  | 06  | 02            |     | 04  | 06  | 02              |
| B  | 01  | 03  | 02            |     | 01  | 03  | 02              |
| A  | 00  | 00  | 00            |     | 00  | 00  | 00              |

Once the metering queue and schedule are settled for a specific flight per, the aircraft's speed, path, altitude and PAP are adjusted to meet the STA as fornormal metering operations.

A delay-banking enabled change in sequence need not require physical movement of an aircraft in an actual queue: modification of the aircraft's position may be virtual. For example, an aircraft that is in a position p in a queue in flight to a metering fix may be given an earlier position p' (<p) for arrival at the destination airport, through modification of the virtual ETA or of the arrival queue for this aircraft at the destination airport. For example, a flight may be scheduled to arrive at a metering fix in position p, enter a holding pattern at/near the metering fix (segregated from other holding flights by altitude), and then be released from the holding pattern in an earlier position p' (<p).

The example above applies to metering restrictions. Users impacted by other flow restrictions, such as rerouting and PAP changes (to avoid congested airspace), may also apply the bidding of delay credits to reduce the impact of restrictions on flights of high priority to users. Each user may bid delay credits to obtain a more preferred route/altitude change for situations where the TMC has the flexibility and choice of valid route/PAP options to apply in the restriction.

The central system CS may reply to a bid by accepting the bid or by rejecting part or all of the bid (e.g., because the bid amount is insufficient to make a difference). Optionally, where the proposed bid is not accepted for the original bid amount, or where the proposed transfer is rejected outright, the central system CS deducts a specified percentage (e.g., 10–30 percent) of the bid amount, or a specified number of delay credits, from the user's account as an administrative, transaction cost in order to discourage excessive bidding or submission of unrealistic bids.

Optionally, the values of the delay credits are attenuated with passage of time in a manner similar to the value attenuation in Eq. (1), discussed in connection with the first aspect. Optionally, where the delay credits for a first flight are used to modify the priority of one or more aircraft flights on a second flight route, or a phase of the second flight route, that is different from the first flight route, or phase of the first flight route, on which the delay credits were originally earned, an additional charge is applied to the delay credits bid for the proposed transfer.

The bidding process may be conducted in near real time, with users submitting bids to the central system CS as their flights approach the time/position that they will be subject to a flow restriction. Alternatively, users may submit their bids and preferences, such as preferred routes and PAP options, ahead of time for consideration by the central system CS if/when a particular flight is subject to a restriction.

Users may simultaneously submit bids for more than one flight subject to the same restriction. In doing so, the user is implicitly able to influence the relative priority between flights operated by that user, such as an airline's arrival bank at a hub airport. Through individual bidding, each user has the opportunity to influence the relative priority between the flights they operate and flights operated by other users.

Aspect 3: Transfer of Delay Credits.

This aspect enables users to transfer delay credits from one flight to another. The purpose is to allow users to bank credits across their fleet and to be able to apply credits earned by one flight to other flights operated by that user. The goal is to allow users to apply their delay credits to their highest priority flights.

Transfer involves two steps, characterized as bank and spend. Users may bank unused credits that are earned by one flight but not used by that flight. Credits are banked with and accounted for by the central system CS. Credits are stored in user accounts with unique information that can be used by the central system CS to determine the value (or "discount") of the credits for use on other flights in subsequent TFM restrictions. This unique information, to be defined by the stakeholders that will operate and use the delay-banking system, may include, among other items: the flight that originally accumulated the credits (e.g., call sign identification, city pair origin/destination, and departure date/time); and the flow restriction (airspace/airport resource protected, type of restriction, ATC facility responsible to implementing the restriction, and the cause of the restriction such as weather or traffic volume). Banked credits are optionally subject to attenuation, as described in aspect 1.

Figure 3A:
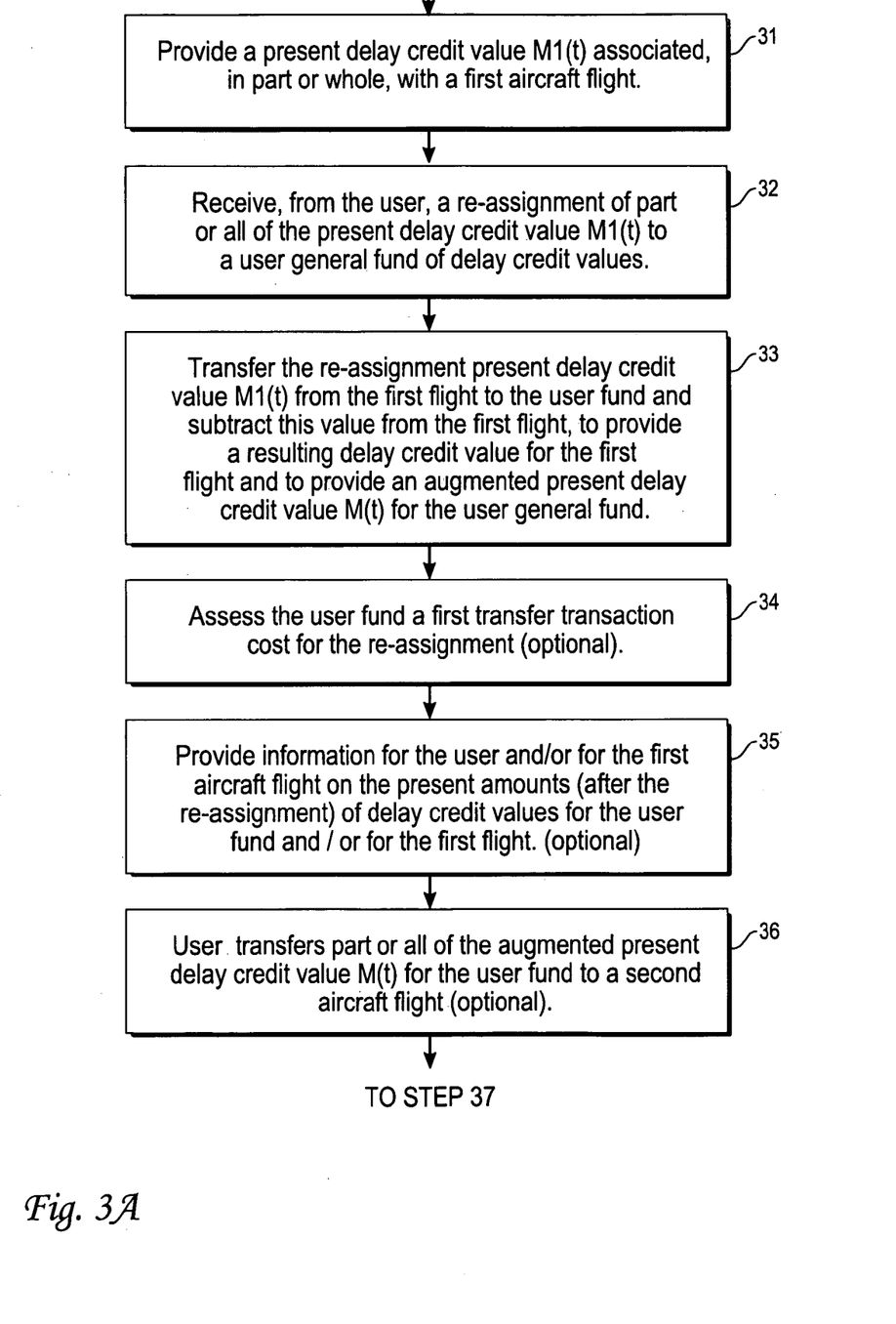
Figure 3B:
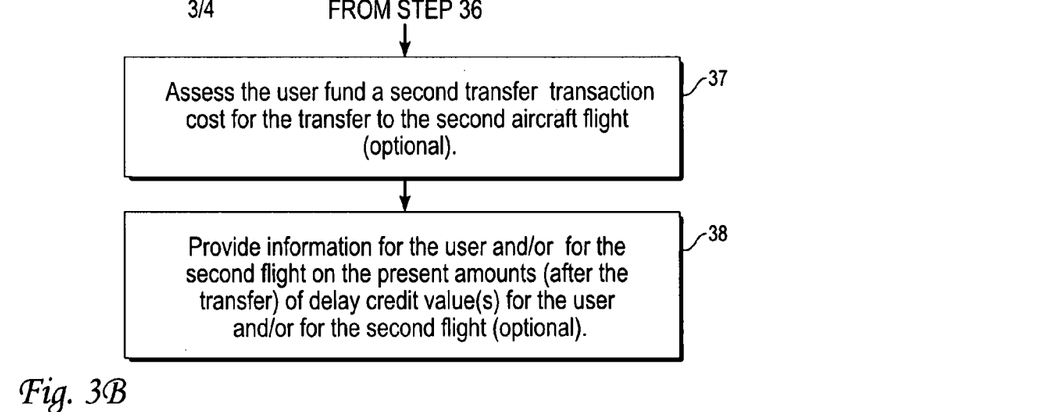

Users may spend banked delay credits on other flights operated by the same user. This effectively allows a user to bid more credits for a particular flight than the credits that were accumulated by that flight pursuant to the first aspect (accumulation). The value of any banked credits may be discounted according to rules established by the system stakeholders to ensure equity and fairness across the user community. The discounted delay credit value is determined by rules applied to the unique information defining the origin of the banked credits and their intended use when transferred to another flight.

Where present delay credits are to be reassigned from a first aircraft flight to at least one other (second) aircraft flight, all belonging to a single user, one speaks of a "transfer" of delay credits. FIG. 3 is a flow chart illustrating a procedure for transfer of delay credits. In step 31, a central system provides a present delay credit value M1(t), associated, in whole or in part, with a first aircraft flight and arising from one or more traffic flow restrictions implemented on one or more resources utilized by the first aircraft flight. In step 32, the system receives, from the user, a re-assignment of part or all of the present delay credit value M1(t) for the first flight to a user general fund of delay credits maintained for the user by the system. In step 33, the system transfers the re-assigned present delay credit value M1(t) from the first flight to the user general fund, and subtracts this re-assigned delay credit value from the first flight, to provide a resulting delay credit value (usually reduced) for the first flight, and to provide an augmented present delay credit value M(;t0t) for the user fund. In step 34 (optional), the user fund is assessed a first transfer transaction cost for the re-assignment from the first flight.

In step 35 (optional), the system provides information for the user and/or the first flight on the present amounts (after the re-assignment) of delay credit values for the user fund and for the first flight.

In step 36 (optional), the user re-assigns part or all of the augmented present delay credit value from the user fund to one or more flights of the user's aircraft (the "second" aircraft flight), which may be the same as or may be different from the first flight. This re-assignment from the user fund to the second flight may occur substantially simultaneously with the re-assignment from the first flight or may occur at a subsequent time. In step 37 (optional), the user fund is optionally assessed a second transfer transaction cost for the transfer to the second flight. The first transfer transaction cost, if any, and the second transfer transaction cost, if any, may be a small percentage (e.g., 10–30 percent) of the present delay credit value re-assigned from the first aircraft, or of the present delay credit value re-assigned to the second aircraft, or the transfer transaction cost, if any, may be a specified amount, determined independently of the amount re-assigned. The transfer transaction cost may be determined by the amount of delay credit value re-assigned, by a lapse of time between assignment from the first aircraft and re-assignment to the second aircraft, by the unique information discussed in the preceding in connection with transfer of delay credits, by the nature of the first aircraft flight and a flight of the second aircraft (e.g., same day, different days, same or different flight directions, same or different geographical regions, same or different flow restrictions for the first aircraft and the second aircraft, etc.), and/or by other relevant considerations. Optionally, the delay credit values accumulated in the user fund are also attenuated, with passage of time, by consideration of the same factors used to attenuate an initial delay credit value, as discussed in connection with Aspect 1 and illustrated in Eq. (1).

In step 38 (optional), the system provides information for the user and/or the second flight on the present amounts (after the transfer) of delay credit values for the user fund and for the second flight.

Aspect 4: Trading of Delay Credits.

In a fourth aspect, delay credits can also be traded between two or more different users, according to market rules that are determined by NAS stakeholders and/or by a central system CS, preferably in a manner that treats smaller users fairly. The delay credit trading procedure may be implemented among users that affirmatively agree to participate, or all users operating in a given region (e.g., an ARTCC sector group or the entire continental U.S.) may be required to participate. However, where a first user proposes a trade with a second user, the second user may accept, negotiate, or decline to trade. The trades may exchanged within a market regulated by the air traffic service provider or other appropriate authority. Delay credits may be traded for cash payment or other valuable consideration, or for delay credits of another user with greater value for particular operational conditions, based on the unique information accounted for by the central system CS and rules established by the market stakeholders.

A first user may propose a trade with a second user, whereby d1 delay credits for the first user are exchanged for d2 delay credits and/or cash or other valuable consideration for the second user, where d1 and d2 are non-negative values. A delay credit trade, if implemented, may be preceded by negotiations of the delay credit value(s) to be exchanged and is preferably implemented by the central system CS.

Figure 4A:
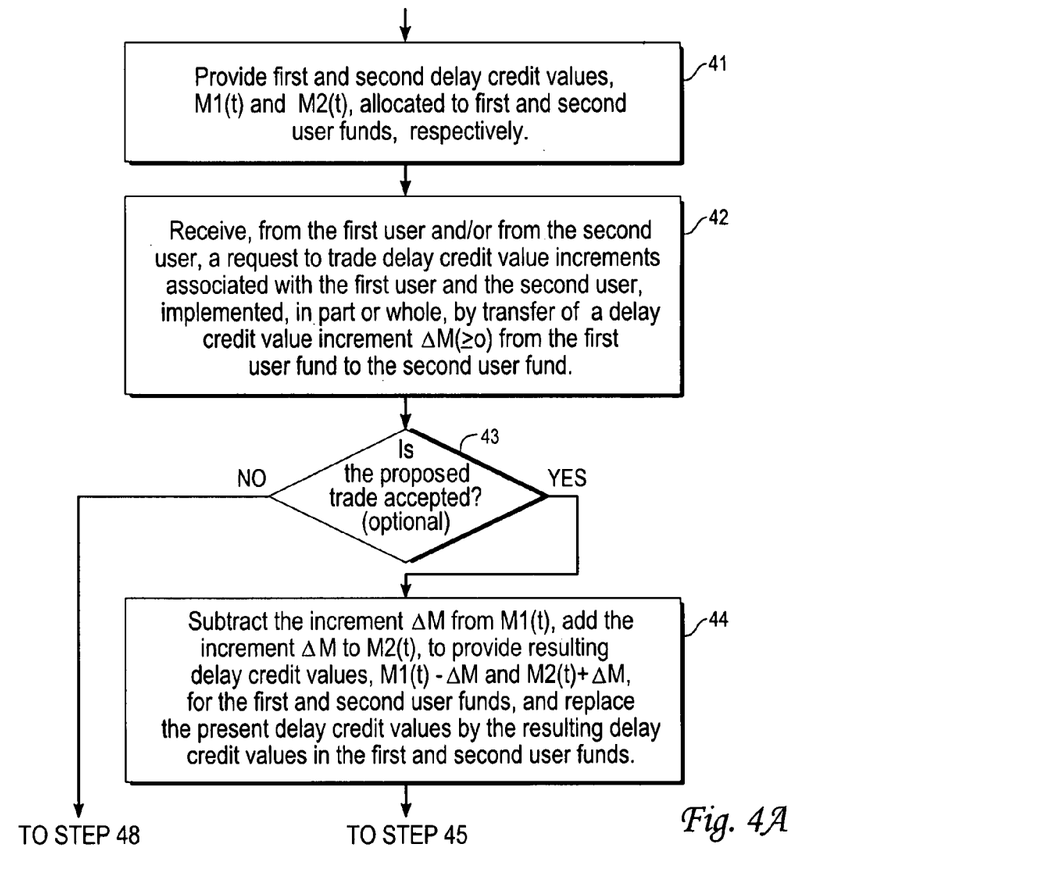
Figure 4B:
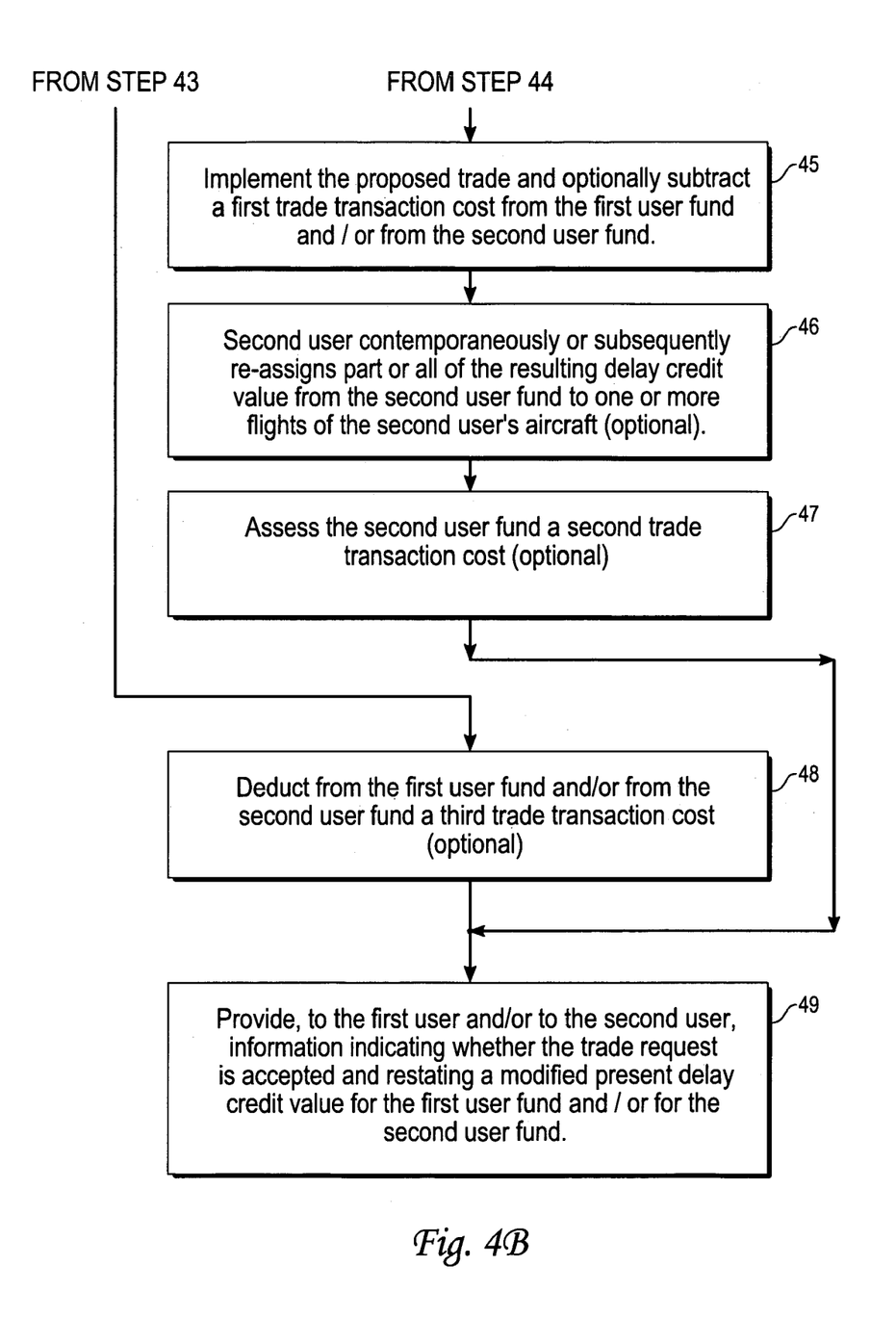

FIG. 4 is a flow chart illustrating a procedure for facilitating trading of delay credits associated with at least a first aircraft flight and a second aircraft flight operated by different users.

In step 41 of FIG. 4, a system provides first and second present delay credit values, M1(t) and M2(t), allocated to first and second user funds, respectively), arising from aircraft flights operated by the first and second users.

In step 42, the system receives, from the first user and/or the second user, a request to trade delay credit value increments associated with the first user and the second user. This trade is proposed to be implemented by transfer of a delay credit value increment $\Delta M$ ($\leq 0$) from the first user fund to the second user fund, both funds being maintained by a central system for the respective first and second users. In step 43, the system optionally determines whether the proposed trade is accepted.

If the answer to the query in step 43 is "yes," or if step 43 is skipped, the system, in step 44, subtracts the specified delay credit value increment $\Delta M$ from the present delay credit value M1(t) for the first fund, adds the specified delay credit value increment to the present delay credit value M2(t) for the second fund, to provide resulting delay credit values, M1(t)–$\Delta M$ and M2(t)–$\Delta M$, for use by the first user and the second user, and replaces the present delay credit values in the first and second user funds by the respective resulting delay credit values. The delay credit value increment $\Delta M$ is optionally transferred with selected unique information describing conditions under which the delay credit value increment was earned on aircraft operated by the first user.

In step 45, the system implements the proposed trade and optionally subtracts an optional first trade transaction cost from the first user fund and/or from the second user fund. The first trade transaction cost is similar to the first and/or second transfer transaction costs assessed in connection with the transfer of delay credits in Aspect 3. The system then proceeds to step 46.

In step 46 (optional), the second user contemporaneously or subsequently re-assigns part or all of the delay credit value from the second user fund to one or more flights of the second user's aircraft. In step 47 (optional), the system assesses the second user fund a second trade transaction cost that is similar to the first and/or second transfer transaction costs. The system then proceeds to step 49

If the answer to the query in step 43 is "no," the system, in step 48 (optional), (i) deducts from the first user fund and/or from the second user fund a third trade transaction cost. This third trade transaction cost is an administrative cost, assessed to discourage requests for unrealistic trades of delay credit value increments. The system then proceeds to step 49.

In step 49, the system optionally provides, or otherwise makes available, to the first user and/or the second user, information indicating whether or not the trade request (received in step 42) is accepted and restates a modified present delay credit value for the first user fund and/or for the second user fund.

Optionally, the delay credit values accumulated in the first user fund and/or in the second user fund is also attenuated, with passage of time, by consideration of the same factors used to attenuate an initial delay credit value, as discussed in connection with Aspect 1 and illustrated in Eq. (1).

Collaborative Tactical-Departure-Release Planning. The purpose of Collaborative Tactical-Departure-Release Planning is twofold: (i) To facilitate more equitable user-preferred departure release times for the airspace users.

(ii) To provide the NAS with better flight intent by users tactically providing the ARTCC/NAS with more accurate and earlier departure-intent information. Collaborative Tactical-Departure-Release Planning is described by the following process. Within each local ARTCC, TMCs notify airspace users in advance (preferably 30 minutes before an event) of any APREQs (departure time approval requests) that will/may be in place for specific departure airports and destinations. This communication would be supported communications protocol, e.g., a system wide information system, to be designated by the air traffic service provider and users. Participating users provide the air traffic service provider with an accurate and up-to-date "departure by" time for each impacted flight of interest. These departure times can then be used in advance by the local ARTCC/TMC to plan departures into the restricted flows, for example, to release a departure from an internal airport into a congested overhead stream of traffic. The TMC reserves a slot based on an equitable allocation of capacity between the departure and other traffic that are estimated to arrive at a metering/spacing reference fix at or near the same time. Depending on the operational situation and preference of the TMC, the reserved departure slot for the overhead stream may be frontloaded (i.e., departed slightly earlier than normal for their metering/spacing slot) to reduce the chance of missing the slot, and delayed in flight (through metering/spacing actions by the radar controller at the controlling sector) to achieve the target metering/spacing slot. The result is that the departure gets off earlier than current operational practice would allow (because the user provided early and accurate intent, and the flight isready to depart in time for a slot of opportunity) while the en route flow absorbs the traffic as equitably as if the departure was from an airport further upstream. Collaborative Tactical-Departure-Release Planning may be implemented as an enhancement to the departure release function developed within the Center TRACON Automation System (CTAS) and the integration of that function with an FAA/CDM network (such as CDM-NET or SWIM) to facilitate tactical CDM communications.

What is claimed is:

1. A method for managing aircraft traffic between an origin airport and a destination airport, the method comprising:

receiving Traffic Flow Management (TFM) information for a route of a flight of a first aircraft from an origin airport to a destination airport, including at least one traffic flow restriction that affects an airport, a traffic flow sector or other resource utilized by the first aircraft; and determining an initial delay credit value M(t0) for the aircraft, operated by an aircraft user, that is associated with the at least one flow restriction at a time t0 determined with reference to a time at which the flow restriction is implemented.

2. The method of claim 1, further comprising determining said initial delay credit value for said aircraft as a function of at least one of the following values: present distance D(dest) of the flight of said first aircraft from a restricted resource; distance D(origin;dest) of said first aircraft from its most recent origin airport to the restricted resource; scheduled cruise altitude for said flight; scheduled flight route; number of flights with substantially the same ETA as said flight at said destination airport; time difference between the ETA for said flight and a scheduled time of subsequent departure of said aircraft from said destination airport; at least one estimated weather condition for said destination airport at the ETA; an estimate of excess fuel carried for said flight between said origin airport and said destination airport; accumulated time delay credits for said flight; number of passengers scheduled to be on board for said flight; time of day of the ETA for said aircraft; day of the week of the ETA for said aircraft; date of the ETA for said aircraft; and a priority index assigned to said first aircraft.

3. The method of claim 1, further comprising computing a subsequent delay credit value M(t;t0) for said flow restriction at a time t that is greater than said time t0, where the delay credit value M(t;t0) is monotonically decreasing from said value M(t0) as a time difference t−t0 increases.

4. The method of claim 3, further comprising choosing said subsequent delay credit value M(t;t0) to be substantially 0 for said time difference t-t0 greater than a selected positive threshold value Δt(thr).

5. The method of claim 1, further comprising choosing said resource from a group of resources comprising said origin airport, said destination airport, an air route traffic control center (ARTCC) destination sector that contains at least part of said destination airport; an ARTCC sector that belongs to a destination ARTCC group that includes the ARTCC destination sector, the destination ARTCC group, and an ARTCC group through which said first aircraft passes in said flight route from said origin airport to said destination airport.

6. The method of claim 1, further comprising receiving from said user of said first aircraft a bid of a selected portion of a delay credit value accumulated for said flight, to provide a present delay credit value, in order to change at least one traffic flow priority for said flight after implementation of said traffic flow restriction.

7. The method of claim 6, further comprising subtracting from said present delay credit value a selected delay credit value increment.

8. The method of claim 7, further comprising selecting said delay credit value increment as a transaction cost.

9. The method of claim 6, further comprising allowing said present delay credit value for said first aircraft to be transferred to at least one other flight having said same user, in order to change at least one effect of said flow restriction on said first aircraft.

10. The method of claim 6, further comprising allowing said delay credit value for said flight to be traded, in a transaction involving at least one other flight having a second user that is different from said user for said flight, in order to change at least one effect of said flow restriction on said first aircraft.

11. The method of claim 1, further comprising choosing said traffic flow restriction for said flight from one or more of the group consisting of: delay in push-back from a departure gate at said origin airport; decrease in air speed for said first aircraft to at most a specified threshold air speed; decrease in ascent rate for said first aircraft; decrease in descent rate for said first aircraft; change in position for said first aircraft in a queue of aircraft traveling along at least one segment of a scheduled route; change in at least one route segment of a planned altitude profile for said first aircraft; and change in at least one segment of said scheduled route for said first aircraft.

12. The method of claim 1, further comprising choosing said resource from a group of resources that includes said origin airport, said destination airport and at least one air route traffic control center (ARTCC) sector through which said first aircraft would pass.

13. A system for managing aircraft traffic between an origin airport and a destination airport, the system comprising a computer that is programmed:
to receive Traffic Flow Management (TFM) information for a route of a flight from an origin airport to a destination airport, including at least one traffic flow restriction that affects an airport, a traffic flow sector or other resource utilized by a first aircraft; and
to determine an initial delay credit value M(t0) for the first aircraft, operated by an aircraft user, that is associated with the at least one flow restriction at a time t0 determined with reference to a time at which the flow restriction is implemented.

14. The system of claim 13, wherein said computer is further programmed to determine said initial delay credit value for said first aircraft as a function of at least one of the following values: present distance D(dest) of the flight of said first aircraft from a restricted resource; distance D(origin;dest) of said first aircraft from its most recent origin airport to the restricted resource; scheduled cruise altitude for said flight; scheduled flight route; number of flights with substantially the same ETA as said flight at said destination airport; time difference between the ETA for said flight and a scheduled time of subsequent departure of said first aircraft from said destination airport; at least one estimated weather condition for said destination airport at the ETA; an estimate of excess fuel carried for said flight between said origin airport and said destination airport; accumulated time delay credits for said flight; number of passengers scheduled to be on board for said flight; time of day of the ETA for said aircraft; day of the week of the ETA for said first aircraft; date of the ETA for said aircraft; and a priority index assigned to said first aircraft.

15. The system of claim 13, wherein said computer is further programmed to compute a subsequent delay credit value M(t;t0) for said flow restriction at a time t that is greater than said time t0, where the delay credit value M(t;t0) is monotonically decreasing from said value M(t0) as a time difference t−t0 increases.

16. The system of claim 15, wherein said computer is further programmed to choose said subsequent delay credit value M(t;t0) to be substantially 0 for said time difference t-t0 greater than a selected positive threshold value Δt(thr).

17. The method of claim 13, wherein said computer is further programmed to choose said resource from a group of resources comprising said destination airport, an air route traffic control center (ARTCC) destination sector that contains at least part of said destination airport, an ARTCC sector that belongs to a destination ARTCC group that includes the ARTCC destination sector, the destination ARTCC group, and an ARTCC group through which said first aircraft passes in said flight route from said origin airport to said destination airport.

18. The system of claim 13, wherein said computer is further programmed to receive from said user of said first aircraft a bid of a selected portion of a delay credit value accumulated for said flight, to provide a present delay credit value, in order to change at least one traffic flow priority for said flight after implementation of said traffic flow restriction.

19. The system of claim 13, wherein said computer is further programmed to subtract from said present delay credit value a selected delay credit value increment.

20. The method of claim 19, wherein said computer is further programmed to select said delay credit value increment as a transaction cost.

21. The system of claim 18, wherein said computer is further programmed to allow said present delay credit value for said first aircraft to be transferred to at least one other flight having said first aircraft user, in order to change said at least one traffic flow priority for said flight.

22. The system of claim 18, wherein said computer is further programmed to allow said delay credit value for said flight to be traded, in a transaction involving at least one other flight having a second user that is different from said user for said flight, in order to change said at least one traffic flow priority for said flight.

23. The system of claim 18, wherein said computer is further programmed to choose said traffic flow restriction for said flight from one or more of the group consisting of: delay in push-back from a departure gate at said origin airport; decrease in air speed for said first aircraft to at most a specified threshold air speed; decrease in ascent rate for said first aircraft; decrease in descent rate for said first aircraft; change in position for said aircraft in a queue of aircraft traveling along at least one segment of a scheduled route; change in at least one route segment of a planned altitude profile for said first aircraft; and change in at least one segment of said scheduled route for said first aircraft.

24. The system of claim 13, wherein said computer is further programmed to choose said resource from a group of resources that includes said origin airport, said destination airport and at least one air route traffic control center (ARTCC) sector through which said aircraft would pass.

25. A method for managing aircraft traffic between an origin airport and a destination airport, the method comprising:
receiving Traffic Flow Management (TFM) information for a route of a first flight of a first aircraft from an origin airport to a destination airport, including at least one traffic flow restriction that affects an airport, a traffic flow sector or other resource utilized by the first aircraft;
providing a present delay credit value M1(t) for the first aircraft, operated by an aircraft user, that is associated with the at least one flow restriction at a time t0 determined with reference to a time at which the flow restriction is implemented; and
receiving, from the user of the first aircraft, an assignment of part or all of the present delay credit value M1(1) to a user fund of delay credit values, maintained for the user, to provide a resulting delay credit value for the first flight and an augmented delay credit value for the user fund.

26. The method of claim 25, further comprising assessing at least one of said first flight and said user fund a first transfer transaction cost for implementing said assignment of said present delay credit value M1(t).

27. The method of claim 25, further comprising providing information for at least one of said user and said first flight concerning a present amount in said user fund after said assignment is implemented.

28. The method of claim 25, further comprising allowing said user to re-assign part or all of said augmented delay credit value for said user fund to a selected second aircraft flight.

29. The method of claim 28, further comprising assessing at least one of said second flight and said user fund a second transfer transaction cost for implementing said assignment of said present delay credit value M1(t).

30. The method of claim 28, further comprising providing information for at least one of said user and said second flight concerning a present amount in said user fund after said re-assignment is implemented.

31. A system for managing aircraft traffic between an origin airport and a destination airport, the system comprising a computer that is programmed:
to receive Traffic Flow Management (TFM) information for a route of a flight of a first aircraft from an origin airport to a destination airport, including at least one traffic flow restriction that affects an airport, a traffic flow sector or other resource utilized by the first aircraft; and
to provide a present delay credit value M1(t) for the first aircraft, operated by an aircraft user, that is associated with the at least one flow restriction at a time t0 determined with reference to a time at which the flow restriction is implemented; and
to receive, from the user of the first aircraft, an assignment of part or all of the present delay credit value M1(1) to a user fund of delay credit values, maintained for the user, in order to provide a resulting delay credit value for the first flight and an augmented delay credit value for the user fund.

32. The system of claim 31, wherein said computer is further programmed to assess at least one of said first flight and said user fund a first transfer transaction cost for implementing said assignment of said present delay credit value M1(t).

33. The system of claim 31, wherein said computer is further programmed to provide information for at least one of said user and said first flight concerning a present amount in said user fund after said assignment is implemented.

34. The system of claim 31, wherein said computer is further programmed to allow said user to re-assign part or all of said augmented delay credit value for said user fund to a selected second aircraft flight.

35. The system of claim 34, wherein said computer is further programmed to assess at least one of said second flight and said user fund a second transfer transaction cost for implementing said assignment of said present delay credit value M1(t).

36. The system of claim 34, wherein said computer is further programmed to provide information for at least one of said user and said second flight concerning a present amount in said user fund after said re-assignment is implemented.

* * * * *